Nov. 6, 1962   V. G. SHARPE   3,062,346
LAUNDRY APPLIANCE WITH CLUTCH
Filed June 30, 1960   2 Sheets-Sheet 2

INVENTOR.
Verlos G. Sharpe
BY Frederick M. Ritchie
His Attorney 3,062,346
LAUNDRY APPLIANCE WITH CLUTCH
Verlos G. Sharpe, Xenia, Ohio, assignor to General Motors Corporation, Detroit, Mich., a corporation of Delaware
Filed June 30, 1960, Ser. No. 39,896
6 Claims. (Cl. 192—48)

This invention relates to a domestic appliance and more particularly to an improved prime moving system for an agitating and spinning mechanism.

The complexity of clothes washer mechanisms has increased with the advent of multiple functions and multiple speeds. In order to achieve multiple speed agitation and multiple speed spin, it is necessary to incorporate speed changing mechanisms and/or multiple speed motors. One type of agitating and spinning mechanism is taught in the commonly assigned copending application Serial No. 748,412, filed July 14, 1958, now Patent No. 2,976,710. The mechanism there disclosed sets forth a plurality of driving pulleys relatively rotatably mounted on a reversible power shaft—a clutch mechanism being interposed between the pulleys and shiftable vertically into engagement with one or the other of said driving pulleys. Ball bearings are utilized to relatively rotatably mount the driving pulleys and the shifter clutch mechanism. In high speed actions, such as high speed spin, any slight misalignment or out of round in the bearings results in an amplification of the audible noise level of the mechanism. The apparent solution to this problem is to utilize bearings which are perfect in every sense, i.e. in perfect alignment and with the balls perfectly in round. However, in mass production techniques, such quality control is both unfeasible and too costly for competitive products. It is to the solution of this noise and bearing misalignment problem that the present invention is directed.

Accordingly, it is an object of this invention to reduce the audible noise level in a prime mover system.

It is also an object of this invention to reduce the audible noise level in an agitating and spinning mechanism for a clothes washer.

A more specific object of this invention is the provision of a prime moving mechanism having upper and lower driving pulleys relatively rotatably mounted by ball bearings on a power shaft and an axially shiftable clutch bearing interposed between said pulleys and adapted to engage one of said pulleys, said shifter clutch having a shaft-affixed plastic clad clutch guide to compensate for misalignment between said shaft and said pulleys, thereby to reduce the operating noise level of said mechanism and to facilitate the utilization of less expensive bearings.

A more general object of this invention is the provision of a plastic clad shaft-mounted clutch guide for supporting an axially shiftable clutch bearing and compensating for bearing misalignment.

Further objects and advantages of the present invention will be apparent from the following description, reference being had to the accompanying drawings wherein a preferred form of the invention is clearly shown.

Figure 1:
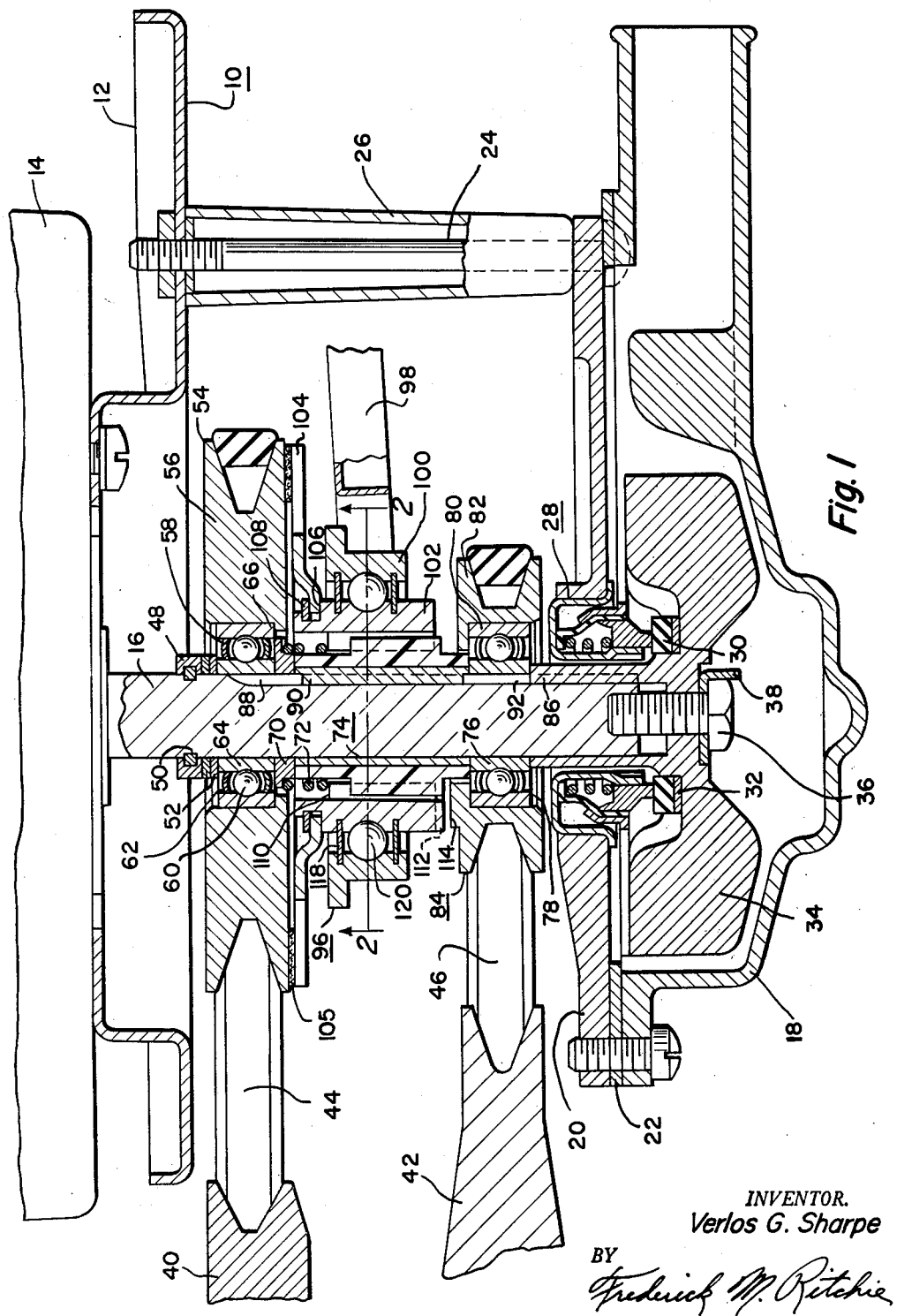
FIGURE 1 is a fragmentary sectional view of a prime moving system suitable for use with the agitating and spinning mechanism for a clothes washer.
Figure 2:
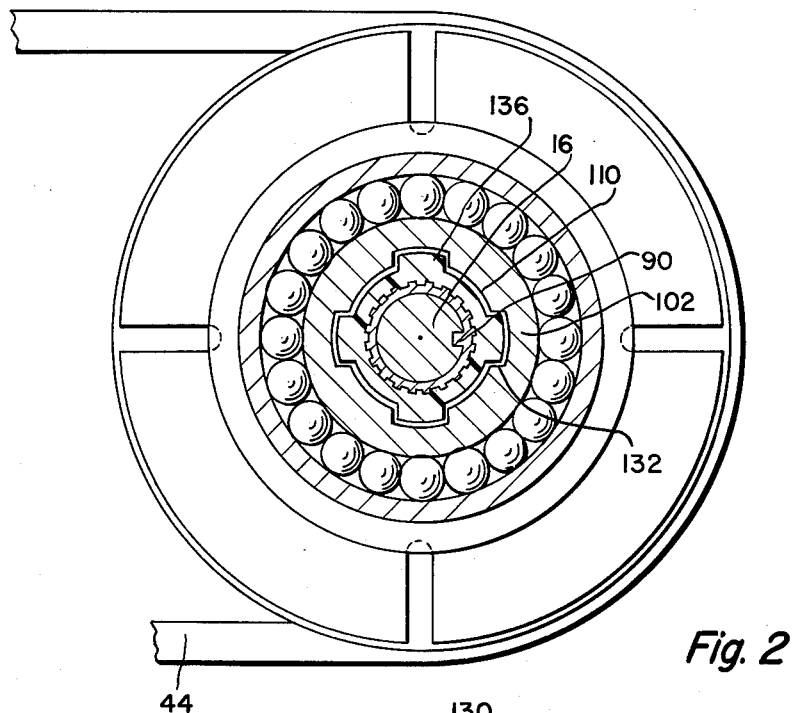
FIGURE 2 is a sectional view taken along the line 2—2 in FIGURE 1.

In accordance with this invention and with reference to FIGURES 1 and 2, a clear and complete explanation of this invention will be set forth. FIGURE 1 illustrates a sectional view of a prime moving system 10 for operating a clothes washing machine of the type taught in the aforementioned copending application. The prime moving system 10 includes a support plate 12 on which a motor 14 is carried. The motor 14 may be a reversible two-speed type which includes a downwardly vertically extending power shaft 16. At the lower terminus of the power shaft 16 is a pump having a pump housing 18 and a pump cover 20. A pump gasket 22 is interposed between the cover 20 and housing 18 and the entire assembly is held by means of the bolt 24 which extends from the pump cover 20 to the support plate 12—a spacer column 26 serving to secure the proper distance between the pump and the motor support plate 12. In accordance with conventional practice, a pump seal assembly 28 is disposed in the pump cover 20 and adapted to prevent leakage from the pump housing around the power shaft 16. This pump seal assembly 28 cooperates with a pump seal washer 30 and a pump impeller gasket 32 to limit the outflow of fluid from the pump housing about the power shaft. The pump impeller 34 is fastened to the lower end of the power shaft 16 by a screw 36 and a lock washer 38. However, before assembling the impeller 34 to the power shaft 16, the components of the prime moving system of this invention are positioned on the power shaft as will be described more fully next following.

The agitating and spinning mechanism for which this invention is adapted includes an upper driven pulley 40 and a lower driven pulley 42. Consequently, the prime moving system 10 is disposed in relatively lateral juxtaposition with the driven pulleys 40 and 42 and interconnected therewith by means of V-belts 44 and 46. Before assembling either the pump impeller 34 or the pump housing at the lower end of the power shaft 16, the following means of assembly may be followed. First, a lock washer 48 may be slipped upwardly along the power shaft 16 until it snaps into an annular shaft groove 50. This lock ring or washer 48 serves to define the uppermost limit of the prime moving system carried by the power shaft 16. Several spacer washers 52 are slipped over the power shaft and positioned immediately below and in engagement with the underside of the washer 48. The motor shaft upper pulley assembly 54 includes the upper pulley 56 and a pulley bearing 58 having a plurality of balls 60 and dust shields, such as 62. An inner race 64 of the bearing 58 abuts the lowermost spacer washer 52 while a shoulder 66 on the upper pulley 56 limits the positioning of the outer race of the bearing 58.

Next below the bearing 58 and in engagement with the inner race thereof is a clutch bearing spring retainer 70 which includes a generally horizontal or radially extending flange for retaining a clutch bearing coil spring 72. Immediately below the retainer 70 and abutting thereagainst is a spacer guide assembly shown generally at 74. This spacer guide assembly which is the substance of the instant invention will be described more fully hereinafter. Suffice it at this point to state that it is in juxtaposition with the remainer 70 at its upper end and in juxtaposition with the inner race 76 of a ball bearing 78 at its lower end. The ball bearing 78 includes an outer race 80 press fitted within a central recess in a lower pulley 82. The bearing 78 and lower pulley 82 comprise a motor shaft lower pulley assembly, designated generally as 84.

The entire stacked assembly of components on the power shaft 16 is completed by an upwardly extending collar 86 on the pump impeller 34. The screw or bolt 36 threadedly engages the lower end of the power shaft 16 to maintain all of the stacked components in rigidly affixed assembly on the shaft. Note that the power shaft 16 is formed with a keyway 88 for receiving a key 90 on the spacer guide 74 and a key 92 on the impeller collar 86. The inner races of the bearings 58 and 78 are merely press fitted onto the motor shaft or power shaft 16.

The driven mechanism, such as an agitating and spinning mechanism for a clothes washer, is operated solely through the driven pulleys 40 and 42. Thus, it is apparent that one or the other of the pulleys 56 or 82 must be selected to facilitate transmitting power from the shaft 16 to one or the other of the driven pulleys 40 or 42. For this purpose, a shifter clutch bearing shown generally at 96 is relatively axially slidably mounted on the spacer guide 74. The clutch bearing assembly 96 is moved vertically by a clutch yoke arm 98 which may be raised and lowered in accordance with the desired operation of the prime moving system. By raising and lowering the yoke arm 98, the clutch bearing 96 is moved selectively upwardly into engagement with the upper pulley 56 or downwardly into engagement with the lower pulley 82. The shifter clutch bearing 96 is comprised of an inner race 102 and an outer bearing race 100 which is yieldingly grippingly engaged by the yoke 98. The clutch plate 104 is positioned on an annular shoulder 106 of the inner race and retained thereon by a clutch plate retainer C-ring 108. Radially inwardly directed shoulders 110 formed between notches 132 on the inner race 102 of the clutch bearing 96 serve to support the lower end of the spring 72 (FIGURE 1), such that the spring 72 opposes the lifting action of the clutch bearing 96 by the yoke arm 98. In other words, when the yoke 98 is not lifting the clutch bearing 96 to place the clutch plate 104 into driving frictional engagement with the upper pulley 56, the spring 72 will be forcing it downwardly into engagement with the lower pulley 82. Dogs, such as 112 on the inner race 102 and 114 on the lower pulley 82, serve to interlock clutch race 102 and pulley 82 into direct driving relationship. Frictional material 105 of cork, synthetic rubber or other suitable material may be interposed between the lower surface of the upper pulley 56 and the clutch plate 104 to improve the frictional driving engagement at this point. As with the pulley bearings 58 and 78 the shifter clutch bearing 96 is provided with dust covers or shields 118 for protecting the balls 120 of the bearing.

It should now be seen that the outer race 100 of the shifter bearing 96 is held relatively motionless by the frictional engagement of the race with the yoke arm 98. The inner race 102, being keyed with the spacer guide 74, rotates with the power shaft 16. The prime moving system thus drives through the upper driving pulley 56 when the yoke arm 98 is raised to place the clutch plate in frictional engagement with the upper pulley 56. On the other hand, when the yoke arm 98 is dropped, the respective dogs 112 and 114 on the inner race 102 and lower pulley 82 respectively, interlock to provide a prime moving driving engagement between the pulleys 82 and 42.

In addition to the bearings 58, 78 and 96 in the prime moving system, there exists also the bearings (not shown) in the motor 14. In order for the noise level of the prime moving system to be at an acceptable level, these four sets of bearings must be perfectly true. However, in actual production practice, it is common to have one or more of the bearings slightly out of alignment, i.e. the inner race is out of alignment with the outer race. In the case of the shifter clutch bearing 96 during operation, the inertia of the yoke arm 98 and the outer race 100 causes these parts to remain relatively motionless. Consequently, any misalignment between outer race 100 and inner race 102 results in a chattering of the inner race with the spacer guide 74. The same can be said in connection with the inner and outer races of the bearings 58 and 78. Further, when the bearings of the motor itself are out of alignment, then the chattering is compounded by a wobbling power shaft in addition to wobbling inner races of a plurality of bearings. It is not feasible to utilize in mass production appliance bearings which are perfect in every respect and noise results. Therefore, it is to the solution of problems relating to noise and bearing quality control that this invention is directed.

Figure 3:
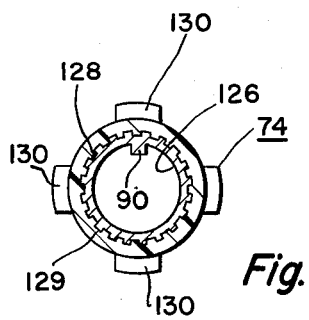
FIGURE 3 is a sectional view of the plastic clad spacer guide taken along line 3—3 in FIGURE 4.
Figure 4:
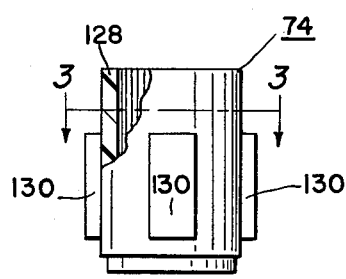
FIGURE 4 is a side elevational view of the plastic clad spacer guide with parts broken away.

A novelly designed spacer guide 74 has been provided which eliminates noise as a problem in a prime moving system of the subject type and permits the use of bearings having slight irregularities, such as misalignment between their respective inner and outer races. With reference to FIGURES 3 and 4, the spacer guide 74 is shown to be comprised of a spacer guide insert 126 and a plastic or polyformaldehyde covering 128, such as Delrin or other suitable material. The insert 126 is formed of sintered iron and includes a radially outer splined surface 129 and a radially inner key 90 which interfits with the keyway 88 on the power shaft 16. The plastic covering 128 is formed on or bonded to the splined outer surface of the insert 126 by an injection molding process which also forms a plurality of driving protuberances or ribs 130. These protuberances 130 interfit in notches 132 formed on the radially inner side of the inner race 102 of the shifter bearing 96. Note that clearance 136 is provided between the plastic covering of the spacer guide and the inner face of the shifter clutch bearing 96. This spacing will accommodate any slight misalignment of the inner and outer races 102 and 100 in the shifter bearing, as well as correct for faulty motor bearings. The plastic covering will absorb or dampen any noise resulting from such relative movement between inner and outer races.

In operation the yoke arm 98 remains fixed and in yieldingly gripping engagement with the outer race 100 of the shifter clutch bearing 96. Any misalignment between inner and outer races shows up in a shaking action at the inner race since the greatest inertia is in the outer race 100 and its supporting yoke arm. Then, too, if the motor shaft 16 is vibrating, there is set up a chattering effect between the shifter clutch bearing 96 and the motor shaft. Either of these resultant problems due to bearing misalignment or irregularities are compensated for by the plastic clad spacer guide 74. The problem is solved regardless of whether the yoke arm 98 has lifted the shifter clutch bearing 96 into frictional driving engagement with the upper pulley 56 or has dropped the shifter clutch bearing so that the inner race thereof is in dogged engagement with the lower driving pulley 82. The improved operation of the prime moving system equipped with the plastic clad spacer guide of this invention is particularly noticeable in a clothes washing machine in high speed spin. This situation results when the yoke arm 98 has lifted the shifter clutch bearing 96 so that it is in driving engagement with the upper pulley 56. At the same time the power shaft 16 is being energized for high speed rotation. The results in sound reduction are remarkable. However, this invention is of particular interest in its unexpected capacity to permit use of lower quality bearings in a prime moving system without increasing the sound level of the system.

It should now be seen that an improved prime moving system has been taught wherein a plastic clad spacer guide interposed between a pair of selectively driven bearing mounted pulleys is effective to permit a cost reduction in a prime moving system by the requirement of less exacting bearings.

While the embodiment of the present invention as herein disclosed constitutes a preferred form, it is to be understood that other forms might be adopted.

What is claimed is as follows:

1. In combination with a laundry appliance having a mechanism adapted to effect an oscillating-type laundry operation when rotated in one direction and another laundry operation when rotated in the opposite direction, said mechanism supporting first and second drive members, and reversible power shaft means for driving said driven members, said power shaft means including first and second driving members relatively rotatably secured to said shaft in respective juxtaposition to said driven members, and a selector bearing means selectively shiftable between said first and second driving members and adapted to transmit power from said shaft means, said selector bearing means having an inner race including a frictional engaging portion for one of said driving members, a positive engaging portion for the other of said driving members, an outer race, and a power shaft affixed spacer guide for reciprocatingly guiding said inner race and transmitting rotatable motion to said inner race, said spacer guide comprising a sintered metal insert keyed to said power shaft and a plastic covering on said insert to dampen noise resulting from misalignment of said inner and outer races.

2. In combination with a laundry appliance having a mechanism adapted to effect an oscillating-type laundry operation when rotated in one direction and another laundry operation when rotated in the opposite direction, said mechanism supporting first and second driven members, and reversible power shaft means for driving said driven members, said power shaft means including first and second driving members relatively rotatably secured to said shaft in respective juxtaposition to said driven members, and a selector bearing means selectively shiftable between said first and second driving members and adapted to transmit power from said shaft means, said selector bearing means having an inner race including a frictional engaging portion for one of said driving members, a positive engaging portion for the other of said driving members, an outer race, and a power shaft affixed spacer guide for reciprocatingly guiding said inner race and transmitting rotatable motion to said inner race, and stationary means actuatingly connected to said outer race for shifting said selector bearing means, said spacer guide comprising a sintered metal insert keyed to said power shaft and a plastic covering on said insert to dampen noise resulting from misalignment of said inner and outer races.

3. In combination with a laundry appliance having an agitate and spin mechanism, said mechanism supporting first and second driven members, and reversible power shaft means for driving said driven members, said power shaft means including first and second driving members including bearings for frictionlessly, relatively rotatably mounting said driving members in said shaft in respective juxtaposition to said driven members, and a selector bearing means selectively shiftable between said first and second driving members and adapted to transmit power from said shaft means, said selector bearing means having an inner race including an upper engaging portion for one of said driving members, a lower engaging portion for the other of said driving members, an outer race, and a power shaft affixed spacer guide for reciprocatingly guiding said inner race and transmitting rotatable motion to said inner race, said spacer guide comprising a metal insert keyed to said power shaft and a plastic covering on said insert to dampen noise resulting from misalignment of said inner and outer races and said bearings.

4. In combination, a power shaft, a first bearing having a first inner race affixed to said power shaft and a first outer race supporting a first pulley, a second bearing member having a second inner race affixed to said power shaft and a second outer race for rotatably supporting a second pulley, and a shifter clutch relatively axially movable along said power shaft into engagement with said first pulley or said second pulley, said shifter clutch comprising a plastic clad spacer guide keyed to said power shaft, an inner race relatively axially shiftable relative to said spacer guide and an outer race, said spacer guide having a plastic covering for compensating for misalignment of said bearings.

5. In combination, a power shaft, a first bearing having an inner race affixed to said power shaft and an outer race supporting a pulley, and a shifter clutch relatively axially movable along said power shaft into selective engagement with said pulley, said shifter clutch comprising a spacer guide keyed to said power shaft, an inner race relatively axially shiftable relative to said spacer guide and an outer race, said spacer guide having a nonmetallic covering for compensating for misalignment of said bearings.

6. The combination of claim 5 wherein said covering is polyformaldehyde.

References Cited in the file of this patent

UNITED STATES PATENTS

| | | |
|---|---|---|
| 1,955,879 | Griswold | Apr. 24, 1934 |
| 2,642,168 | Black et al. | June 16, 1953 |
| 2,826,056 | Bruchman | Mar. 11, 1958 |
| 2,857,777 | Porter | Oct. 28, 1958 |
| 2,881,597 | Jacobs | Apr. 14, 1959 |

FOREIGN PATENTS

| | | |
|---|---|---|
| 450,291 | Canada | Aug. 3, 1948 |